UNITED STATES PATENT OFFICE.

WILHELM BAUER, ALFRED HERRE, AND RUDOLF MAYER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

VAT DYE.

1,074,405.  Specification of Letters Patent.  Patented Sept. 30, 1913.

No Drawing.  Application filed February 11, 1913. Serial No. 747,699.

*To all whom it may concern:*

Be it known that we, WILHELM BAUER, ALFRED HERRE, and RUDOLF MAYER, doctors of philosophy, chemists, citizens of the German Empire, residing at Elberfeld, Germany, have invented new and useful Improvements in New Vat Dye, of which the following is a specification.

We have found that new and valuable vat dyestuffs can be obtained by condensing indoxyls which are substituted in position 6 with 5.7-dihalogenated isatins. The reaction proceeds most probably in accordance with the following equation:

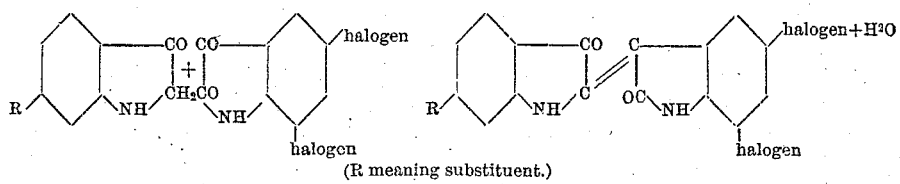

(R meaning substituent.)

The new dyes are in a dry state reddish-brown crystals with a metallic luster which are soluble in hot nitrobenzene with a red coloration. They yield with hydrosulfite and caustic soda lye yellow vats dyeing cotton after exposure to air red shades fast to chlorin and to light.

In order to illustrate the new process more fully the following example is given, the parts being by weight:—220 parts of 5.7-dichloroisatin are dissolved in 5000 parts of hot glacial acetic acid, a solution of 167 parts of 6-chloro-indoxyl in 500 parts of glacial acetic acid and then 100 parts of concentrated hydrochloric acid are added. The resulting mixture is heated during one hour on the water bath. The dyestuff which has separated is filtered off after cooling, washed and dried. It has most probably the following formula:

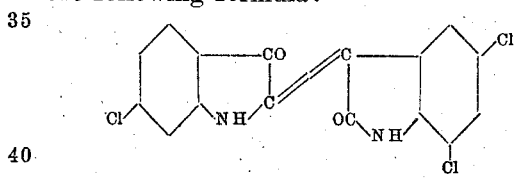

crystallizes in brown needles having a metallic luster which are difficultly soluble in concentrated sulfuric acid with a brownish-red color and easily soluble in monohydrated sulfuric acid with a reddish-violet color. It dyes cotton from the hydrosulfite vat in pure red shades fast to chlorin, washing and light. Similar dyes are obtained on using instead of 6-chloro-indoxyl described in the example 6-methyl-, 6-alkoxy- or 6-thioalkylindoxyl. On using 5.7-dibromoisatin instead of 5.7-dichloroisatin products are obtained capable of dyeing cotton in more bluish-red shades.

We claim:—

1. The new products being vat-dyestuffs derivable from an indoxyl substituted in position 6 and a 5.7-dihalogenated isatin and having the following graphically represented formula:

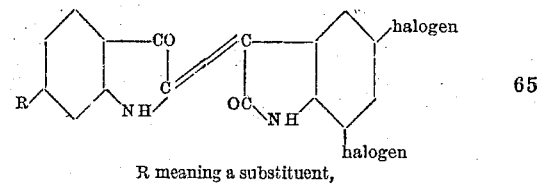

R meaning a substituent, which dyes are in a dry state reddish-brown crystals with a metallic luster soluble in hot nitrobenzene generally with a red coloration; and which yield with hydrosulfite and caustic soda lye vats dyeing cotton red shades remarkable for their fastness to chlorin and to light, substantially as described.

2. The new product having most probably the formula:

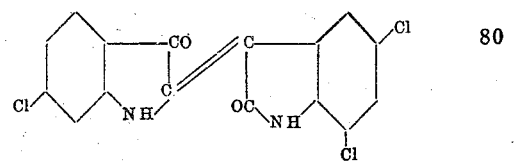

being a vat dye derivable from 5.7-dichloroisatin and 6-chloroindoxyl, which is in a dry state a brown crystalline powder with a metallic luster, soluble in concentrated sulfuric acid with a brownish-red color and in monohydrated sulfuric acid with a reddish-violet color; and dyeing cotton from the hydrosulfite vat in red shades fast to chlorin, washing and light, substantially as described.

In testimony whereof we have hereunto set our hands in the presence of two subscribing witnesses.

WILHELM BAUER. [L. S.]
ALFRED HERRE. [L. S.]
RUDOLF MAYER. [L. S.]

Witnesses:
HELEN NUFER,
ALBERT NUFER.